(12) United States Patent
Reuss et al.

(10) Patent No.: US 9,096,116 B2
(45) Date of Patent: Aug. 4, 2015

(54) DRIVE WITH AN INTERNAL COMBUSTION ENGINE AND AN EXPANSION MACHINE WITH GAS RETURN

(75) Inventors: Thomas Reuss, Neuenstadt (DE); Marc Fessler, Eberstadt (DE); Johannes Dawidziak, Grossinderfeld (DE)

(73) Assignee: AUDI AG, Ingolstadt (DE)

( * ) Notice: Subject to any disclaimer, the term of this patent is extended or adjusted under 35 U.S.C. 154(b) by 217 days.

(21) Appl. No.: 13/336,071

(22) Filed: Dec. 23, 2011

(65) Prior Publication Data
US 2012/0324884 A1  Dec. 27, 2012

(30) Foreign Application Priority Data
Dec. 24, 2010  (DE) .......................... 10 2010 056 238

(51) Int. Cl.
| | |
|---|---|
| *F02G 3/00* | (2006.01) |
| *F01N 5/04* | (2006.01) |
| *B60K 6/12* | (2006.01) |
| *F02B 21/00* | (2006.01) |

(52) U.S. Cl.
CPC . *B60K 6/12* (2013.01); *F02B 21/00* (2013.01); *B60K 2006/123* (2013.01); *Y02T 10/6208* (2013.01)

(58) Field of Classification Search
CPC ....... F02B 37/127; F02B 21/00; F02B 37/005
USPC ......... 60/613, 273, 597, 598, 280; 123/559.1, 123/564
See application file for complete search history.

(56) References Cited

U.S. PATENT DOCUMENTS

| | | | |
|---|---|---|---|
| 7,076,952 B1* | 7/2006 | Vetrovec | 60/605.1 |
| 7,177,751 B2 | 2/2007 | Froloff et al. | |
| 7,370,630 B2 | 5/2008 | Turner et al. | |
| 8,078,385 B2* | 12/2011 | Vetrovec | 701/103 |
| 8,136,488 B2* | 3/2012 | Haas et al. | 123/41.29 |

(Continued)

FOREIGN PATENT DOCUMENTS

| | | |
|---|---|---|
| CH | 508 127 | 7/1971 |
| DE | 196 00 910 | 6/1996 |

(Continued)

OTHER PUBLICATIONS

DE102008008723A1 English Translation of Foreign Publication attached.*

(Continued)

*Primary Examiner* — Thai Ba Trieu
*Assistant Examiner* — Shafiq Mian
(74) *Attorney, Agent, or Firm* — Henry M. Feiereisen LLC.

(57) ABSTRACT

A drive for a vehicle includes an internal combustion engine having a combustion chamber delimited by a cylinder and a piston, a compressed gas storage connectable with the combustion chamber for storing a gas compressed in the combustion chamber, a separate expansion machine for expanding compressed gas from the combustion chamber or from the compressed gas storage by performing mechanical work, and devices for supplying gas from the expansion machine into the combustion chamber or into an intake passage of the internal combustion engine. The drive may, alternatively or in addition, also include devices for heating the compressed gas from the combustion chamber or from the compressed gas storage before the compressed gas enters into the expansion machine.

11 Claims, 7 Drawing Sheets

(56) References Cited

U.S. PATENT DOCUMENTS

| | | | |
|---|---|---|---|
| 8,479,514 B2* | 7/2013 | Mayr | 60/598 |
| 2002/0157397 A1* | 10/2002 | Kapich | 60/608 |
| 2003/0230085 A1* | 12/2003 | Sumser et al. | 60/602 |
| 2007/0119168 A1* | 5/2007 | Turner | 60/600 |
| 2009/0090336 A1* | 4/2009 | Lejeune | 123/568.12 |
| 2009/0173071 A1* | 7/2009 | Kapich | 60/605.2 |
| 2009/0223220 A1* | 9/2009 | Vuk | 60/602 |
| 2010/0139266 A1* | 6/2010 | Gerum | 60/600 |
| 2010/0146968 A1* | 6/2010 | Simpson et al. | 60/605.2 |
| 2010/0180584 A1* | 7/2010 | Berger et al. | 60/320 |
| 2011/0023820 A1 | 2/2011 | Dönitz et al. | |
| 2011/0041496 A1* | 2/2011 | Mayr | 60/611 |
| 2011/0094486 A1* | 4/2011 | Vuk | 123/568.21 |
| 2012/0055153 A1* | 3/2012 | Murata et al. | 60/602 |

FOREIGN PATENT DOCUMENTS

| | | |
|---|---|---|
| DE | 102007033693 | 1/2009 |
| DE | 102007059145 | 6/2009 |
| DE | 102008008723 | 8/2009 |
| DE | 102008008723 A1 * | 8/2009 |
| DE | 10 2008 011 407 A1 | 9/2009 |
| DE | 10 2008 036 157 A1 | 2/2010 |
| DE | 10 2009 033 868 A1 | 2/2010 |
| DE | 10 2008 057 544 A1 | 5/2010 |
| EP | 1308614 A1 * | 5/2003 |
| EP | 1 308 614 B1 | 6/2008 |
| EP | 2 154 355 A1 | 7/2008 |
| FR | 2 831 609 | 5/2003 |
| FR | 2 836 181 A1 | 8/2003 |
| GB | 2428653 | 2/2007 |
| WO | WO 2004/106713 A1 | 12/2004 |
| WO | WO 2007115579 A2 * | 10/2007 |
| WO | WO 2009/036992 A1 | 3/2009 |
| WO | WO 2010/000285 A1 | 1/2010 |

OTHER PUBLICATIONS

EP1308614A1 English Translation of Foreign Publication attached.*
"Hybridmotor mit Druckluft-Energiespeicher" in NET-Journal, vol. 15, Nr. 1 /2, Jan./Feb. 2010, p. 22-23.
Guzzella et al.„Das Downsizing-Boost-Konzept auf Basis der pneumatischen Hybridisierung von Ottomotoren in MTZ Jan. 2010, vol. 71, p. 52-58.

* cited by examiner

DRIVE WITH AN INTERNAL COMBUSTION ENGINE AND AN EXPANSION MACHINE WITH GAS RETURN

CROSS-REFERENCES TO RELATED APPLICATIONS

This application claims the priority of German Patent Application, Serial No. 10 2010 056 238.6, filed Dec. 24, 2010, pursuant to 35 U.S.C. 119(a)-(d), the content of which is incorporated herein by reference in its entirety as if fully set forth herein.

BACKGROUND OF THE INVENTION

The present invention relates to a drive for a vehicle, in particular a motor vehicle, with an internal combustion engine and to a method for operating a drive for a vehicle, in particular a drive for a motor vehicle, with an internal combustion engine.

The following discussion of related art is provided to assist the reader in understanding the advantages of the invention, and is not to be construed as an admission that this related art is prior art to this invention.

A hybrid engine for a motor vehicle with a compressed air energy store, wherein air is compressed in the combustion chambers of the internal combustion engine when the motor vehicle brakes and this compressed air is temporarily stored in a compressed air energy store, is known in the art. The compressed air can again be supplied from the compressed air energy store into the combustion chambers of the internal combustion engine as needed, for example when the internal combustion engine is started. In conjunction with the compressed air, a larger quantity of the fuel can also be supplied into the cylinders for boosting the internal combustion engine during compression.

It would therefore be desirable and advantageous to obviate prior art shortcomings and to provide an improved drive for a vehicle with an internal combustion engine and an improved method for operating a drive for a vehicle with an internal combustion engine, in particular a drive for a motor vehicle such that the energy contained in the compressed gas can be optimally utilized.

SUMMARY OF THE INVENTION

The present invention is based on the concept to utilize the residual energy and/or the residual pressure of the gas, which passes through the expansion machine but is not completely expanded, for improving the charging of the internal combustion engine in certain operating states. Whereas in a conventional open system the gas is discharged into the environment after passing through the expansion machine, it can be supplied to a further use by employing the feature combinations according to the invention.

According to one aspect of the present invention, a drive for a vehicle includes an internal combustion engine having at least one combustion chamber delimited by a cylinder and a piston, at least one compressed gas store connectable with the at least one combustion chamber for storing a gas storage compressed in the at least one combustion chamber, a separate expansion machine for expanding compressed gas storage from the at least one combustion chamber or from the compressed gas store by performing mechanical work, and devices for supplying gas from the expansion machine into the at least one combustion chamber or into an intake passage of the internal combustion engine.

According to another aspect of the invention, a drive for a vehicle includes an internal combustion engine having at least one combustion chamber delimited by a cylinder and a piston, at least one compressed gas store connectable with the at least one combustion chamber for storing a gas compressed in the at least one combustion chamber, a separate expansion machine for expanding compressed gas from the at least one combustion chamber or from the compressed gas store by performing mechanical work, and devices for heating the compressed gas from the at least one combustion chamber or from the compressed gas store before the compressed gas enters into the expansion machine.

According to yet another aspect of the invention, a method for operating a drive for a vehicle, in particular a motor vehicle, with an internal combustion engine, a compressed gas store storage connectable with at least one combustion chamber of the internal combustion engine, and a separate expansion machine, includes the steps of expanding a gas compressed in the at least one combustion chamber in the expansion machine by performing work, and supplying at least a portion of the gas from the expansion machine into the at least one combustion chamber or into an intake passage of the internal combustion engine.

According to still another aspect of the invention, a method for operating a drive for a vehicle, in particular a motor vehicle, with an internal combustion engine, a compressed gas storage connectable with at least one combustion chamber of the internal combustion engine, and a separate expansion machine, includes the steps of expanding a gas compressed in the at least one combustion chamber in the expansion machine by performing work, and heating the compressed gas from the at least one combustion chamber or from the compressed gas storage before the compressed gas enters into the expansion machine.

According to an advantageous feature of the present invention, the internal combustion engine may have several cylinders or combustion chambers into which the gas from the expansion machine is alternatingly supplied.

According to an advantageous feature of the present invention, the devices for heating the compressed gas may be embodied as a heat exchanger, for example an exhaust gas heat exchanger, in which the compressed gas is further heated through heat transfer from the exhaust of the internal combustion engine beyond the heating that occurs during compression. In this way, on one hand, the energy content of the compressed gas and hence the amount of energy recoverable in the expansion machine is increased and, on the other hand, at least a portion of the energy contained in the exhaust gas of the internal combustion engine is supplied to a beneficial use.

According to another advantageous feature of the present invention, the expansion machine may be a single-stage expansion machine with a single pressure stage, but may also have several consecutive pressure stages. According to an advantageous feature of the present invention, the expansion machine may include at least one turbine because a turbine requires a relatively small installation space and is also capable of converting the energy stored in the compressed gas directly into a rotary motion.

According to yet another advantageous feature of the present invention, the expansion machine may be coupled with a generator for generating electrical energy, because a rotor of the generator can thus be powered by the rotation of a turbine wheel of the turbine while experiencing only a small energy loss.

According to an advantageous feature of the present invention, the generator may be controlled by a control device, which may simultaneously also control the supply of the gases which exit from the expansion machine and are supplied into the combustion chambers and/or the intake passage of the internal combustion engine. In this way, the electrical power supplied by the generator can be increased and, if not needed by the onboard network of the vehicle, stored in a vehicle battery if no additional compressed gas or only a small quantity of compressed gas is required for charging the internal combustion engine. Conversely, the electrical power supplied by the generator can be reduced when, for example, a higher charge pressure should be provided in certain operating states of the internal combustion engine, for example in the lower RPM range for overcoming the so-called turbo lag or in transient operation of the internal combustion engine, which would typically require a greater quantity of compressed gas to be supplied into the combustion chambers or into the intake passage from the compressed gas storage.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
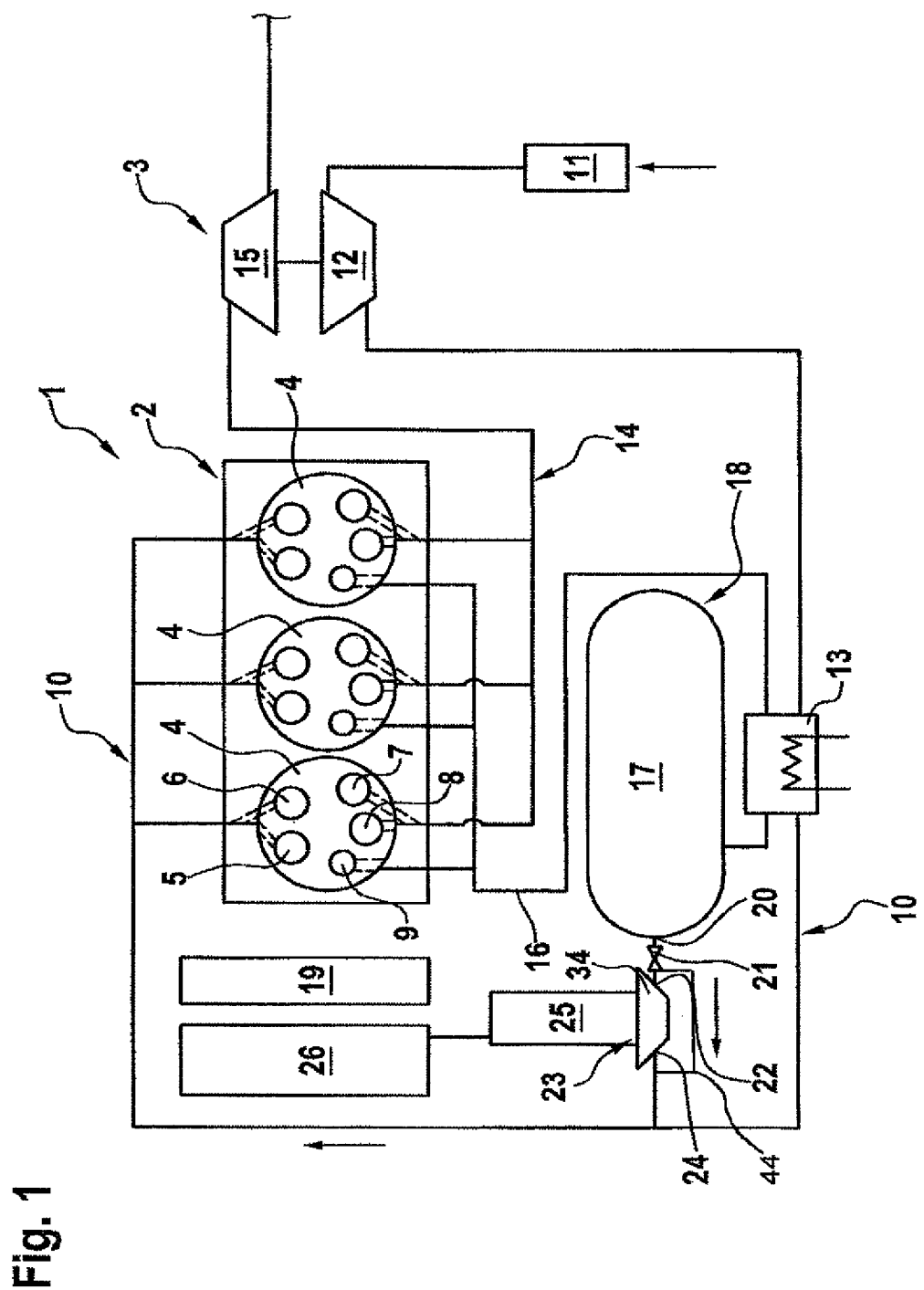
FIG. 1 is a schematic diagram of a drive according to the invention for a motor vehicle, wherein a completely or partially expanded gas from a separate expansion machine is supplied into an intake passage of an internal combustion engine downstream of a compressor of the exhaust gas turbocharger.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in form of a schematic diagram a drive 1 for a motor vehicle which includes an internal combustion engine 2 with an exhaust gas turbocharger 3. For sake of simplification, only three cylinders 4 of the internal combustion engine 2 are shown, wherein each cylinder delimits in the conventional manner together with a cylinder head and a piston (not shown) a combustion chamber into which a fuel can be supplied. Above each cylinder, the cylinder head has two intake ports 5, 6 provided with intake valves and three exhaust ports 7, 8, 9 provided with exhaust valves. The intake ports 5 and 6 of each cylinder 4 are connected with an intake passage 10 of the internal combustion engine 2, which includes an air filter 11, a compressor 12 of the exhaust gas turbocharger 3 and a charge air cooler 13. The exhaust ports 7 and 8 of each cylinder 4 are connected with an exhaust gas passage 14 of the internal combustion engine 2 which includes a turbine 15 of the exhaust gas turbocharger 3. The exhaust port 9 of each cylinder 4 is not connected with the exhaust gas passage 14, but instead with a storage vessel 17 of compressed gas storage 18 by way of a manifold 16. The exhaust ports 9 of the cylinders 4 and the manifold 16 are used to supply in a braking or overrun phase of the internal combustion engine 2 compressed, gas which is supplied into the cylinders 4 while the fuel supply is interrupted and compressed in the cylinders 4 during the compression, from the cylinders 4 while the fuel supply is interrupted and compressed in the cylinders 4 during the compression, from the cylinders 4 into the compressed gas storage 18 for temporary storage, wherein the stored compressed gas can be withdrawn again as needed.

The compressed gas from each cylinder 4 is always supplied into the compressed gas storage 18 during a compression stroke by opening the exhaust valve in the exhaust port 9 of the cylinder 4 in the vicinity of the top dead center of the piston. The opening times of the exhaust valves of the exhaust ports 9 are controlled by an engine controller 19 of the internal combustion engine 2. Possible approaches for controlling the exhaust valves of the exhaust ports are described in the aforementioned publications and will therefore not be discussed here in detail.

Because compressed gas is withdrawn from a cylinder 4, a greater drag work is performed in the cylinder 4 during the expansion stroke of the cylinder 4 following the compression stroke due to the deficiency in air mass and the reduced pressure level. The internal combustion engine 2 then operates as a cooling machine while in the braking or overrun phase compressed gas is supplied from the cylinders 4 into the compressed gas store storage 18 where it is temporarily stored. This in turn causes an increased braking action of the internal combustion engine 2 operating as an engine brake.

To maximize the quantity of the compressed gas stored in the storage vessel 17 commensurate with a maximum compressive strength defined in the design of the compressed gas storage 18, the manifold 16 arranged upstream of the compressed gas storage 18 includes a heat exchanger for cooling the compressed gas, which is preferably the charge air cooler 13.

If the internal combustion engine 2 includes an (unillustrated) exhaust gas return, then exhaust gases or an exhaust gas/air mixture may be compressed in the cylinders 4 instead of the compressed gas and supplied into the compressed gas storage 18.

The compressed gas temporarily stored in the compressed gas storage 18 can be used with the drive 1 according to the invention for two different purposes: on one hand, the compressed gas may be completely or partially expanded by performing mechanical work. On the other hand, the compressed gas may be supplied in a partially expanded state as charge air into the intake passage 10 of the internal combustion engine 2, for example for briefly increasing the charge pressure in transient operating states.

For the first purpose mentioned above, an outlet 20 of the compressed gas storage 18 is connected via a valve 21 with adjustable flow cross-section to an inlet 22 of an expansion machine 23, wherein for the last-mentioned purpose the outlet 24 of the expansion machine 23 is connected with the intake passage 10. The expansion machine 23 is formed by a turbine 34 having a turbine wheel which is set in rotation by the compressed gas exiting the compressed gas storage 18 when the valve 21 is open. The shaft of the turbine wheel is coupled with the rotor of a generator 25, so that the generated 25 can generate electrical energy and supply the generated electrical energy to a vehicle battery 26 and/or the (unillustrated) onboard network of the motor vehicle, when the gas from the compressed gas storage 18 flows through the expansion machine 23.

The controllable valve 21 arranged downstream of the outlet 20 of the compressed gas storage 18 and the generator 25 are controlled by the engine controller 19 of the internal combustion engine 2, namely on one hand depending on the desired quantity and the desired pressure of the compressed gas to be supplied into the intake passage 10 and, on the other hand, depending on the quantity of the electrical energy to be generated by the generator. For example, the valve 21 can be wide open and the turbine 34 and the generator 25 can be operated in idle when a large quantity of compressed air at high pressure is to be supplied into the intake passage 10. To reduce the quantity of the air supplied into the intake passage 10, the flow cross-section of the valve 21 can be reduced. To reduce both the pressure and the quantity of the air supplied into the intake passage 10, the load of the generated 25 and thus the flow resistance of the turbine can be increased, whereby the fraction of the compressed air energy converted into electrical energy in the generator 25 increases. When the flow cross-section of the valve 21 is increased, the pressure of the air supplied into the intake passage 10 can be reduced without reducing the quantity of air. If only electrical energy is to be produced, then the pressure can be reduced essentially down to atmospheric pressure through a commensurate increase of the load. The energy content of the stored compressed air can thereby be optimally used for both purposes.

Optionally, a bypass line (not shown) may be disposed between the inlet 22 and the outlet 24 of the expansion machine 23, through which the compressed gas can be supplied from the compressed gas storage into the intake passage 10, bypassing the expansion machine 23, for eliminating a loss of efficiency when electrical energy is not demanded from the onboard network or for charging the vehicle battery 26.

Figure 2:
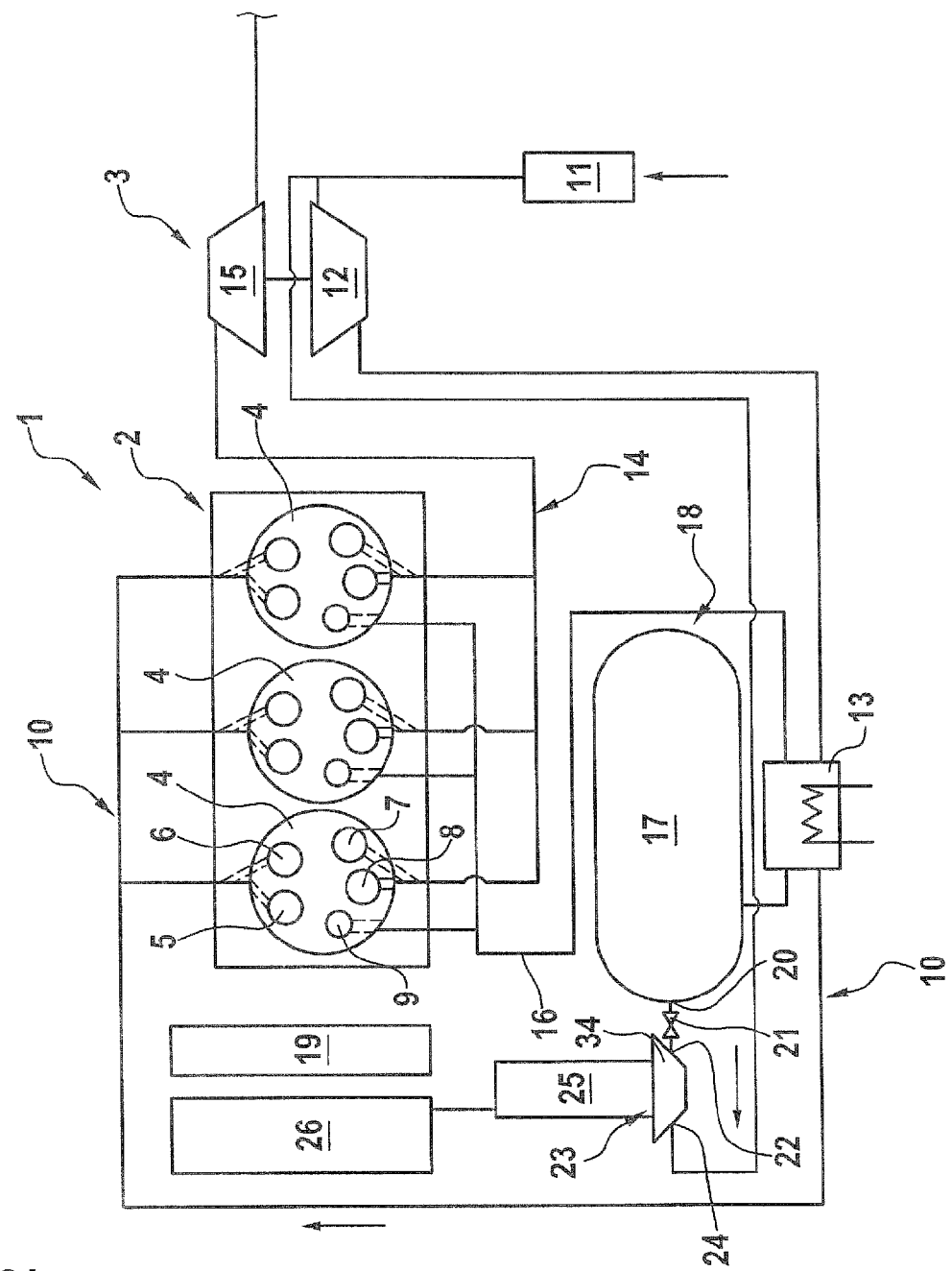
FIG. 2 is a diagram similar to FIG. 1, wherein however the gas from the expansion machine is supplied into the intake passage upstream of the compressor of the exhaust gas turbocharger.
Figure 3:
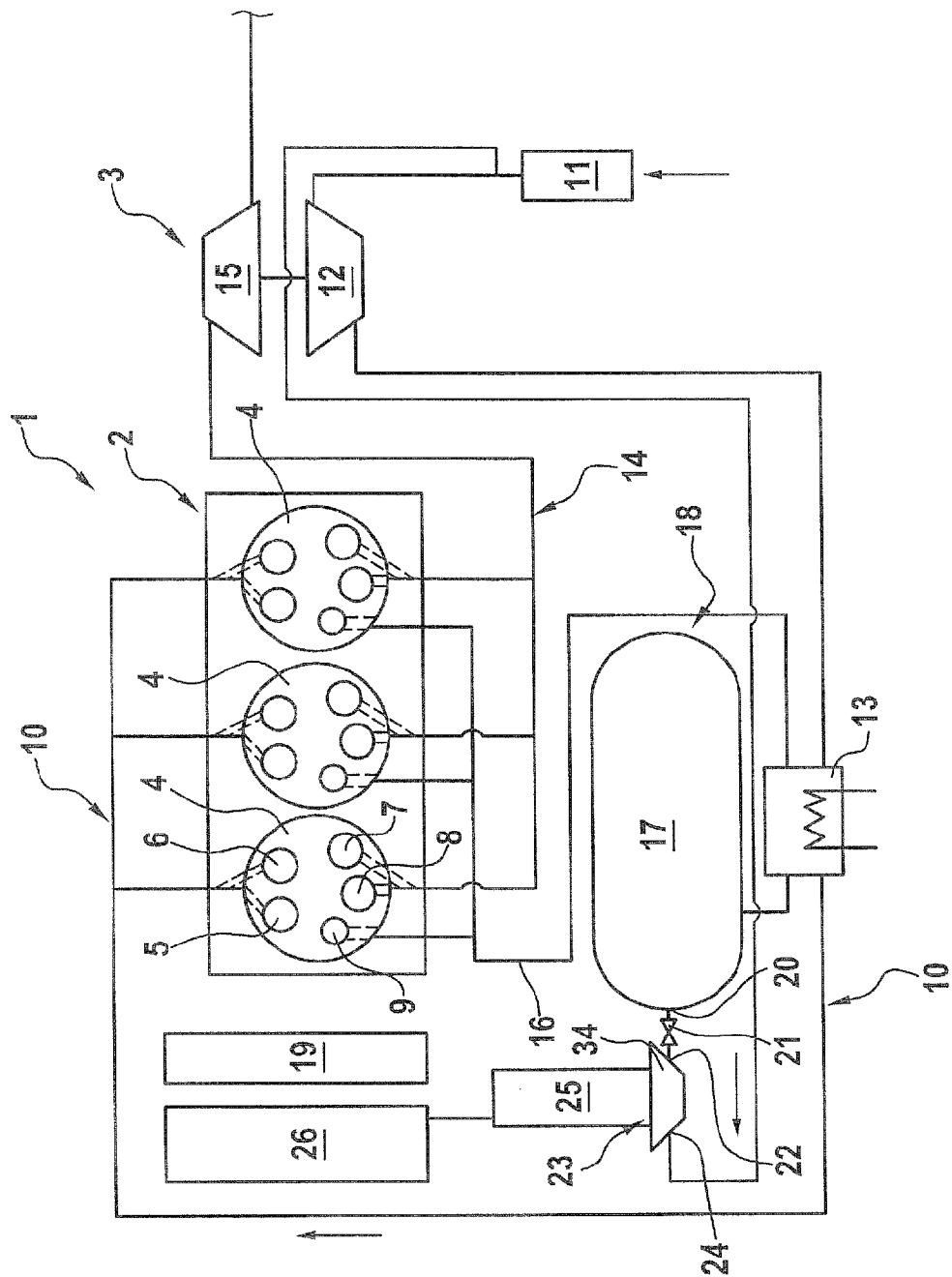
FIG. 3 is a diagram similar to FIGS. 1 and 2, wherein however the gas from the expansion machine is supplied into the intake passage downstream of an air filter.

The drive 1 in FIG. 2 differs from the drive 1 in FIG. 1 in that the expanded compressed pas exiting from the expansion machine 23 is supplied into the intake passage 10 upstream of the compressor 12 of the exhaust gases turbocharger 3, whereas the compressed gas from the expansion machine 23 in the drive of FIG. 3 is supplied into the intake passage 10 downstream of the air filter 11.

Figure 4:
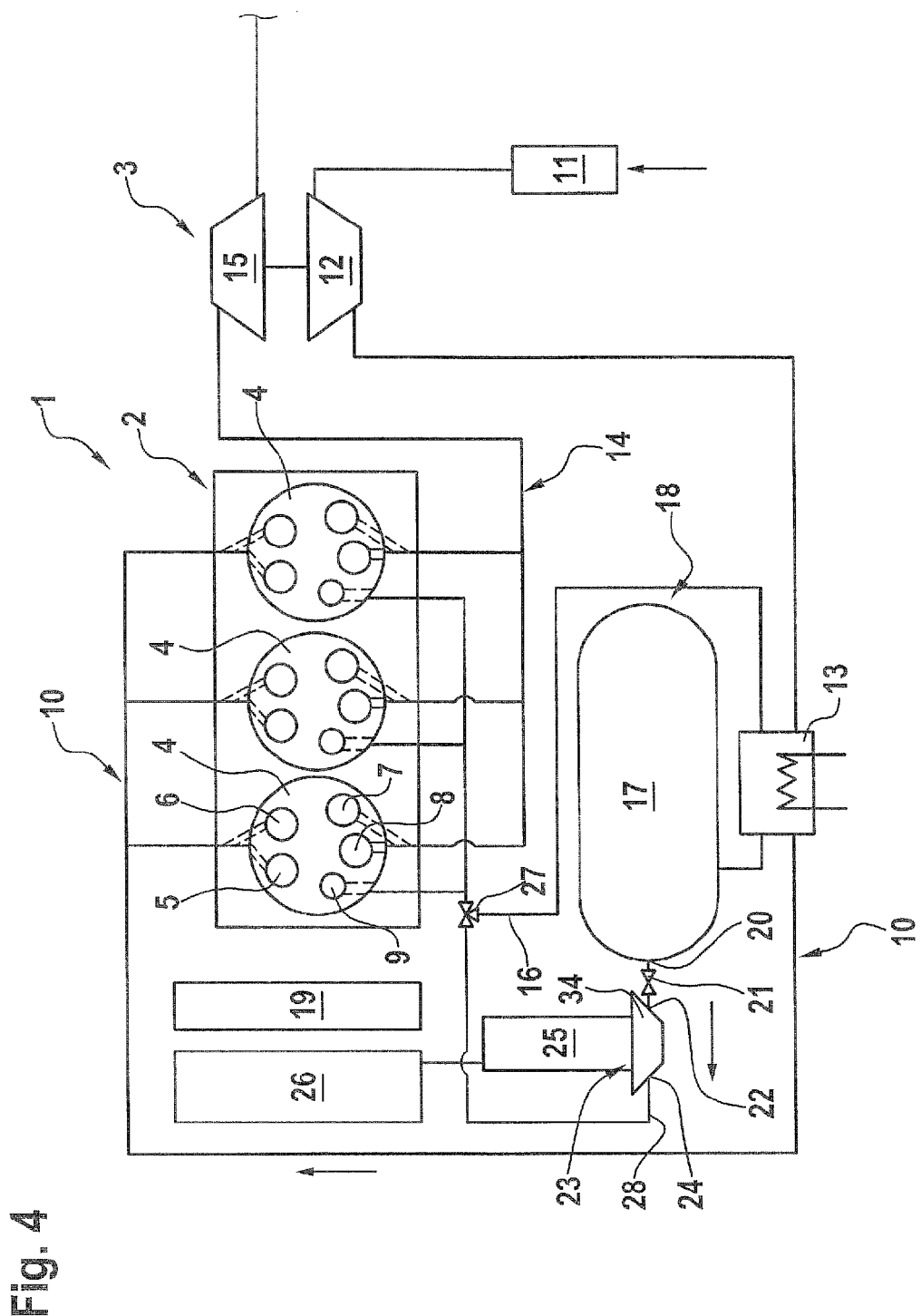
FIG. 4 is a diagram similar to FIG. 1, wherein however the gas from the expansion machine is directly supplied into the combustion chambers of the internal combustion engine.

Conversely, with the drive of FIG. 4, expanded compressed gas the from the expansion machine 23 is supplied directly into the combustion chambers of the internal combustion engine 2 without being detoured via the intake passage 10. For this purpose, the manifold 16 is provided with a three-way valve 27 which is connected via a line 28 with the outlet 24 of the expansion machine 23, so that the compressed gas after flowing through the expansion machine 23, can be conveyed into the combustion chambers through the manifold 16 and the exhaust ports 9.

The compressed gas directly supplied from the compressed gas storage 18 into the combustion chambers can be used to a start the internal combustion engine 2 without a starter in a direct start mode with the help of the compressed air or to implement a pure compressed air operation of the internal combustion engine 2 without supplying fuel into the combustion chambers. In both situations, the compressed air is supplied into the combustion chambers under high pressure from the compressed gas storage 18 preferably without significant expansion in the expansion machine 23 or through the bypass line disposed between the inlet 22 and the outlet 24 of the expansion machine 23, whereby the supply is controlled with the engine controller 19 by opening and closing the exhaust valves in the exhaust ports 9. The direct supply of the compressed gas into the combustion chambers can also be used to accelerate the motor vehicle by not only supplying compressed air into the combustion chambers when operating the internal combustion engine 2 as a motor, but by simultaneously increasing also the quantity of the fuel supplied into the combustion chambers, in order to increase the drive power of the internal combustion engine 2 through "boosting."

Figure 5:
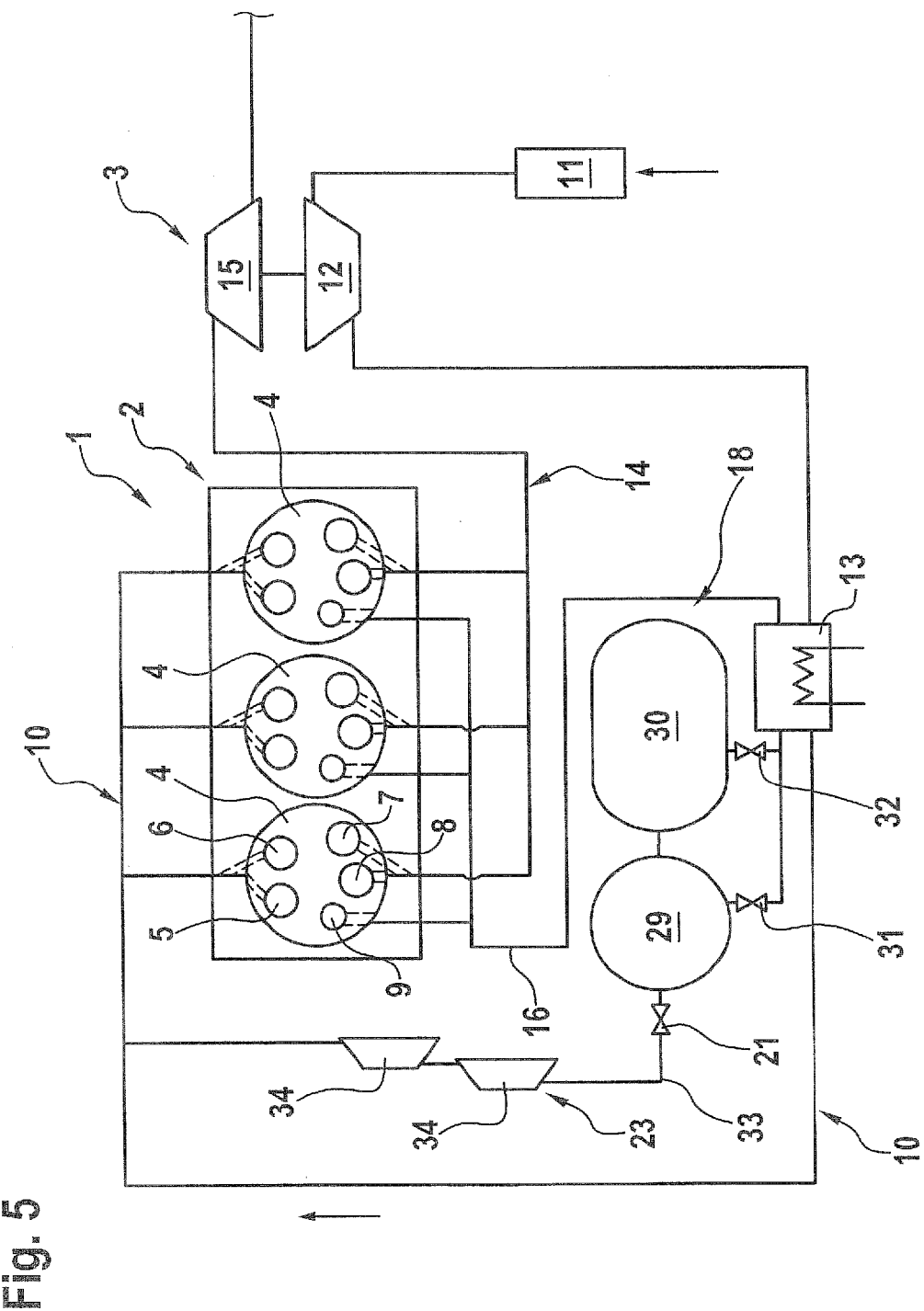
FIG. 5 is a schematic diagram of another drive according to the invention for a motor vehicle.

The drive 1 in FIG. 5 differs from the afore described drives 1 in that, on one hand, a two-stage compressed gas storage 18 with two storage vessels 29, 30 is provided instead of a single-stage compressed gas storage 18. Both storage vessels 29, 30 are connected to the manifold 16 via corresponding separate supply lines equipped with controllable shutoff valves 31, 32, so that a higher pressure can be applied to one of the two storage vessels 29, 30 through suitable control of the shutoff valves 31, 32 and the exhaust valves in the exhaust ports 9, whereas a lower pressure is applied to the second storage vessel. The two storage vessels 29, 30 are connected to the expansion machine 23 by a single line 33 having a controllable valve 21, wherein the expansion machine 23 in the drive of FIG. 5 is constructed as a two-stage expansion machine 23 with two turbines connected in series.

Figure 6:
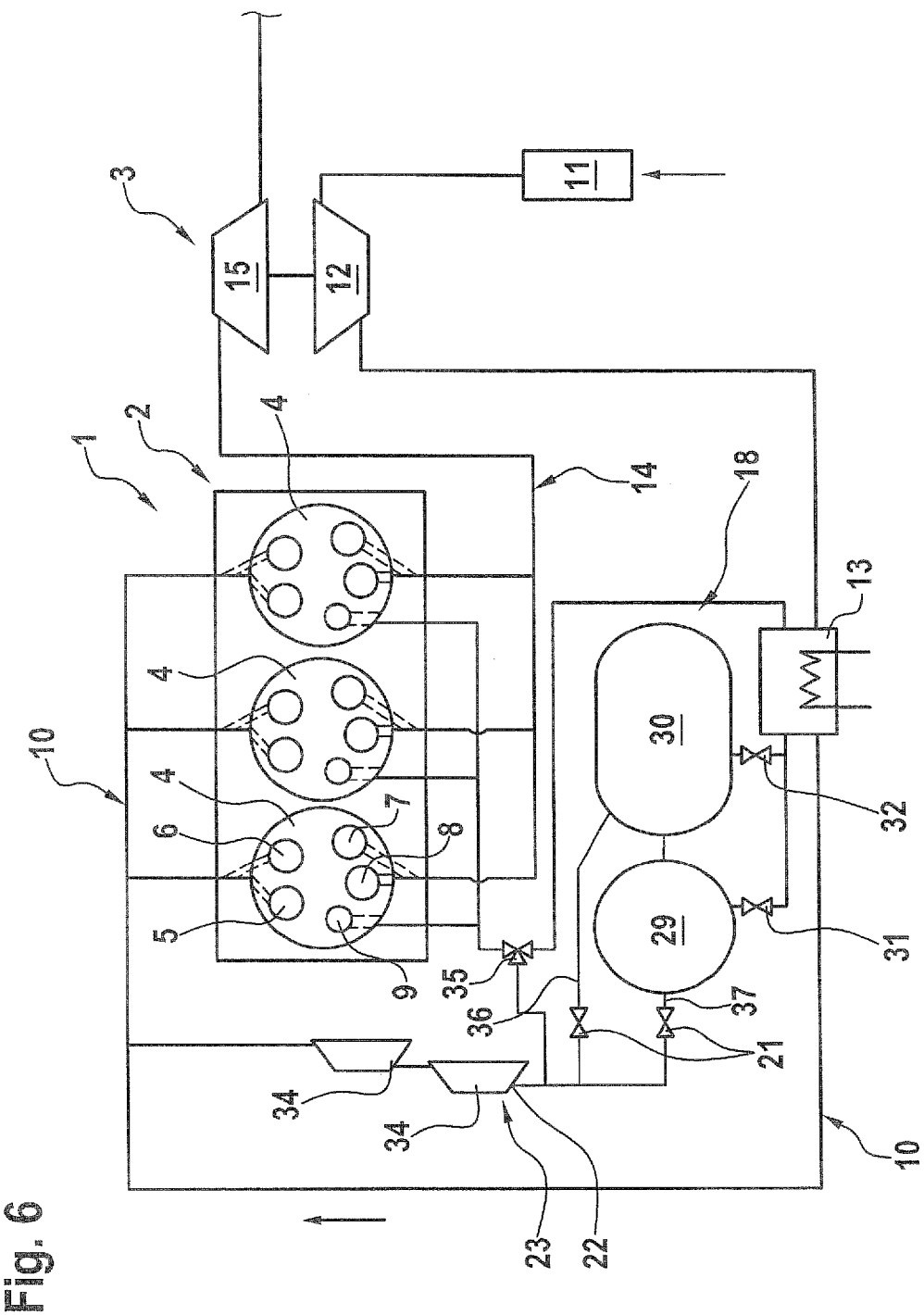
FIG. 6 is a diagram similar to FIG. 5, wherein however compressed gas can be supplied from the combustion chambers of the internal combustion engine directly into the expansion machine.

In the drive of FIG. 6, the manifold 16 may be selectively connected via a three-way valve 35 either with the compressed gas storage 18 or directly with the inlet 22 of the expansion machine 23 for applying compressed air from the combustion chambers of the cylinders 4 through the exhaust ports 9 and the manifold 16 to the expansion machine 23 directly, i.e., without temporary storage in the compressed gas storage 18, for generating electrical energy. The two storage vessels 29, 30 of the compressed gas storage 18 are here furthermore connected to the expansion machine 23 via two separate lines 36, 37 equipped with controllable valves 21, so that compressed gas under higher pressure or under lower pressure can be selectively applied to the expansion machine 23, depending on the demand for electrical energy from the onboard network or for charging the vehicle battery 26.

Figure 7:
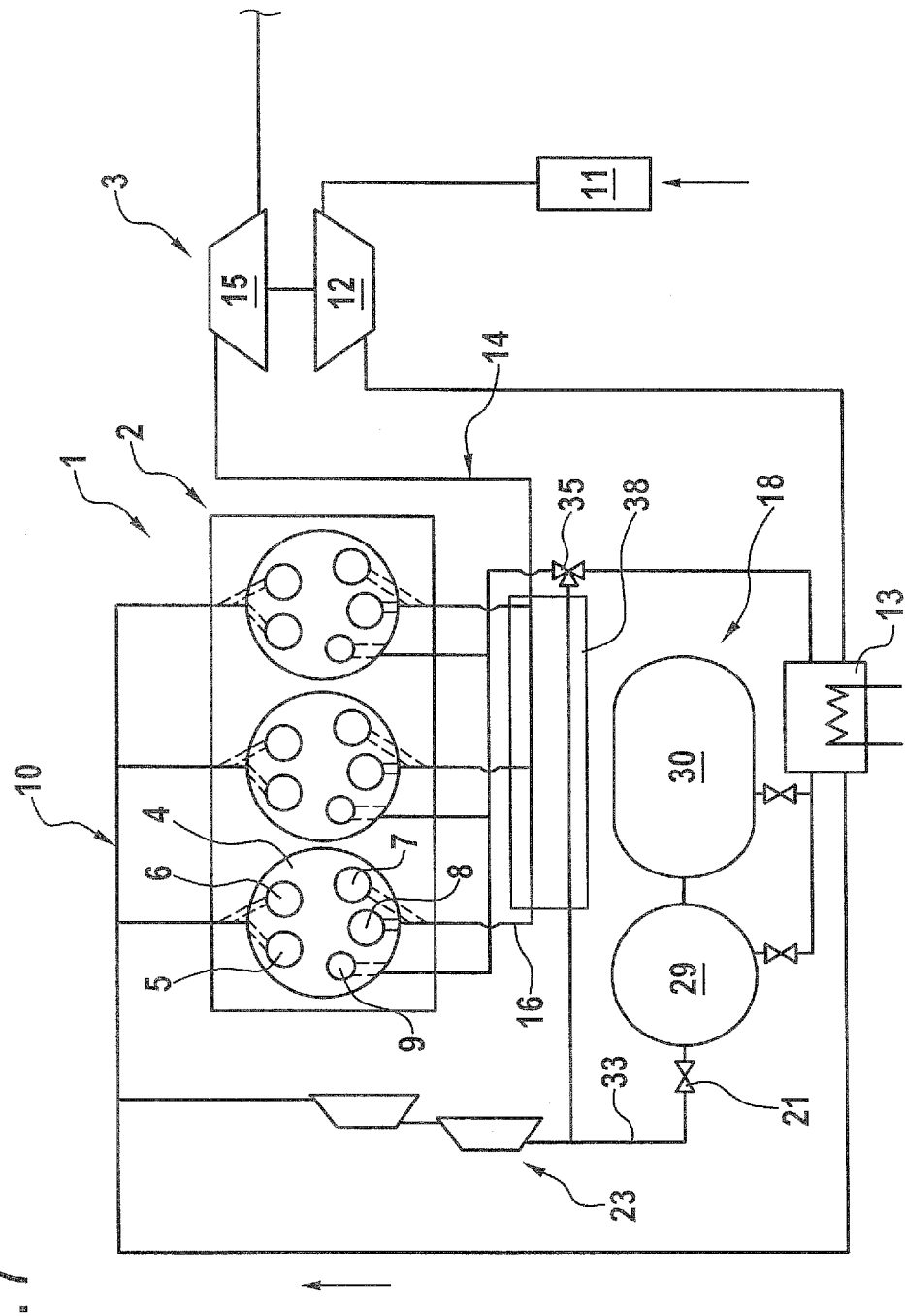
FIG. 7 is a diagram similar to FIG. 6, wherein however the compressed gas from the combustion chambers of the internal combustion engine can be heated again before being supplied into the expansion machine.

With the drive in FIG. 7, the manifold 16 can also be selectively connected via a three-way valve 35 with the compressed gas storage 18 or directly with the expansion machine 23, wherein however additionally an exhaust gases heat exchanger 38, through which exhaust gases and compressed air flows, is arranged between the three-way valve 35 and the expansion machine 23 for increasing the temperature of the compressed gas before supplying the compressed gas into the expansion machine 23, thereby significantly increasing the performance of the expansion machine 23. A portion of the otherwise unusable exhaust gas energy of the internal combustion engine 2 can then be used in an open process cycle. This approach has a significant advantage over a closed steam process cycle because the compressed gas heated in the exhaust gases heat exchanger 38 can be used as combustion air for the combustion in the internal combustion engine 2 after expansion in the expansion machine 23. In contrast to a closed steam process cycle, no condenser is required, which not only reduces the number of components, but also the installation space.

An exhaust gases heat exchanger (not illustrated) through which exhaust gases and compressed gas flow can also be arranged between the compressed gas storage 18 and the expansion machine 23 for increasing the temperature of the compressed air gas from the compressed gas storage 18 before the compressed air is supplied into the expansion machine 23, which also increases the performance of the expansion machine 23.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive for a vehicle, comprising:
   an internal combustion engine having at least one combustion chamber delimited by a cylinder and a piston,
   at least one compressed gas storage connected with the at least one combustion chamber for storing a gas compressed in the at least one combustion chamber,
   an expansion machine for expanding the compressed gas from the at least one combustion chamber or from the compressed gas storage by performing mechanical work,
   wherein the expansion machine including at least one turbine supplying gas through an intake passage into the at least one combustion chamber of the internal combustion engine,
   an exhaust manifold connected to each cylinder;
   wherein the each cylinder including at least one exhaust port and at least one additional exhaust port, and
   a three-way valve having an inlet connected to the exhaust manifold and a first output and a second output, wherein the first output is connected to the compressed gas storage and the second output is connected directly to an inlet of the expansion machine, such that the gas compressed in the at least one of combustion chamber is supplied to at least one of the compressed gas storage and directly to the inlet of the expansion machine
   wherein the at least on additional exhaust port is connected to an exhaust pas passage of the internal combustion engine.

2. The drive of claim 1, wherein the vehicle is a motor vehicle.

3. The drive of claim 1, wherein the expansion machine comprises at least one pressure stage.

4. The drive of claim 1, wherein the expansion machine is coupled with an electrical generator for converting the mechanical work into electrical energy.

5. The drive of claim 1, further comprising a control device for controlling the mechanical work performed by the expansion machine or electrical energy generated from the mechanical work and controlling at least one of a quantity and pressure of gas supplied from the expansion machine into at least one of the at least one combustion chamber and the intake passage of the internal combustion engine.

6. The drive of claim 1, wherein the compressed gas storage comprises at least one stage and at least one storage vessel.

7. The drive of claim 1, further comprising a control device for controlling a supply of the compressed gas storage from the at least one exhaust port during one of braking and over run of the internal combustion engine and removing the compressed gas stored in the compressed gas storage during start mode of the internal combustion engine.

8. The drive of claim 1, further comprising:
   a heat exchanger for heating the compressed gas from the at least one combustion chamber or from the compressed gas storage before the compressed gas enters into the expansion machine.

9. The drive of claim 8, wherein the heat exchanger is an exhaust gas heat exchanger.

10. A method for operating a drive for a motor vehicle, with an internal combustion engine, a compressed gas storage connected with at least one combustion chamber of the internal combustion engine, and an expansion machine, comprising the steps of:
    compressing a gas in the at least one combustion chamber to produce a compressed gas;
    expanding the compressed gas in the expansion machine to perform work,
    supplying at least a portion of gas expanded in the expansion machine into the at least one combustion chamber or into an intake passage of the internal combustion engine, and
    supplying the compressed gas from the at least one combustion chamber to at least one of the compressed gas storage and an inlet of the expansion machine;
    wherein the supplying of the compressed gas is via at least one exhaust port of a cylinder of the at least one combustion chamber and an exhaust manifold using a three-way valve; and
    discharging exhaust gas from the at least one combustion chamber via an exhaust gas passage of the internal combustion engine using at least one additional exhaust port.

11. The method of claim 10, further comprising heating the compressed gas from the at least one combustion chamber or from the compressed gas storage before the compressed gas enters into the expansion machine.

* * * * *